United States Patent [19]

Morello

[11] 4,356,838
[45] Nov. 2, 1982

[54] GUILLOTINE VALVE

[75] Inventor: Aldo Morello, Villeurbanne, France

[73] Assignee: Etablissements Trouvay & Cauvin, Le Havre, France

[21] Appl. No.: 197,730

[22] Filed: Oct. 16, 1980

[51] Int. Cl.$^3$ .......................... F16K 3/02; F16K 3/314
[52] U.S. Cl. .................................... 137/242; 137/244; 251/327; 251/326
[58] Field of Search ................ 137/242, 244; 251/328, 251/327

[56] References Cited

U.S. PATENT DOCUMENTS

| | | | |
|---|---|---|---|
| 1,675,986 | 7/1928 | Mason | 251/328 X |
| 1,753,278 | 4/1930 | Quinn et al. | 251/328 X |
| 3,194,259 | 7/1965 | Garrod | 251/328 X |
| 3,269,694 | 8/1966 | Hardison | 251/328 X |
| 3,603,349 | 9/1971 | Botnick | 251/368 X |

FOREIGN PATENT DOCUMENTS 597429  5/1960  Canada .............................. 137/242

Primary Examiner—Arnold Rosenthal
Attorney, Agent, or Firm—Michael F. Petock

[57] ABSTRACT

The technical field of the invention is that of valves of the guillotine type for powdered, granulated or pasty products.

The object is to provide such valves which are self-cleaning and therefore avoid a wedging of the guillotine plate which opposes the sealing effect of the closure of the valve by the plate.

The gist of the solution of this problem resides in the fact that there are interposed, between the slideways of the body of the valve and the slidable plate straight elongated section members which are rigid with the slidable plate and are distinctly longer than this plate. These section members fill the whole of the space of the slideways and prevent the product passing through the valve from penetrating and accumulating in the slideways.

The main use of the invention resides in the equipment of installations conveying powdered, granulated or particulate products.

11 Claims, 10 Drawing Figures

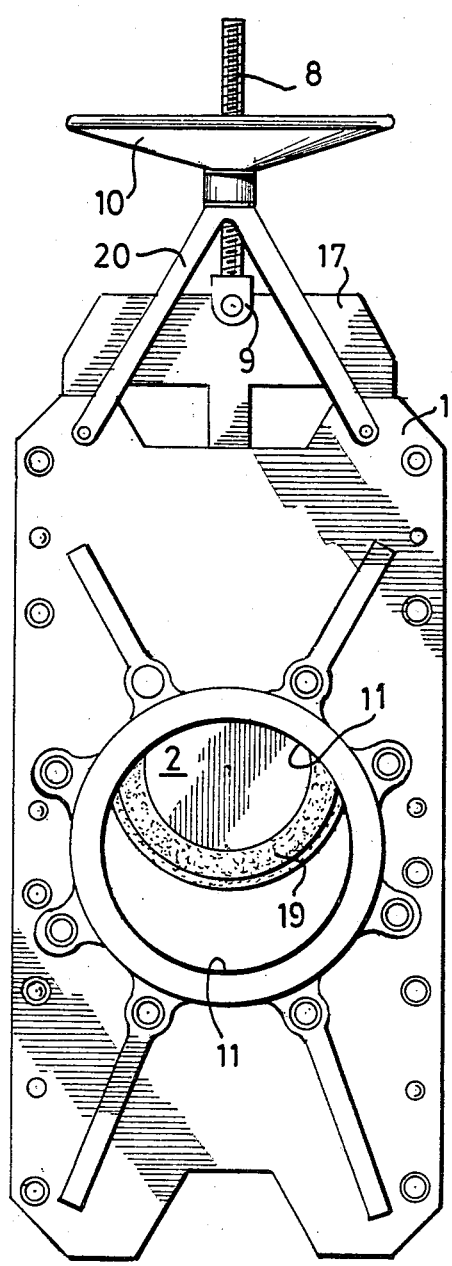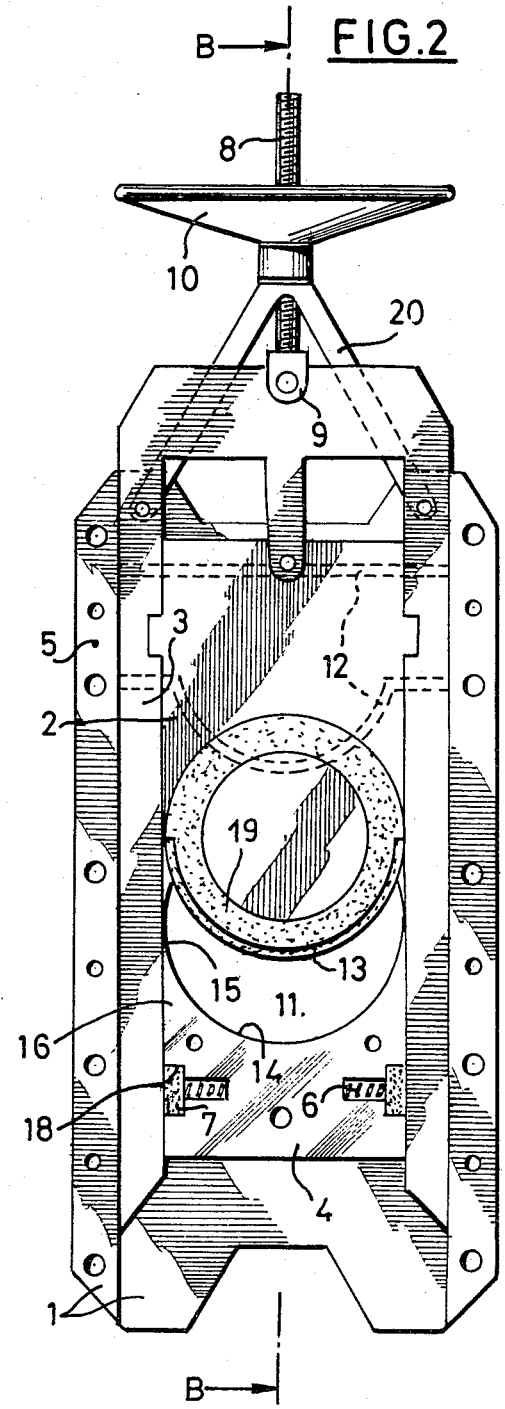

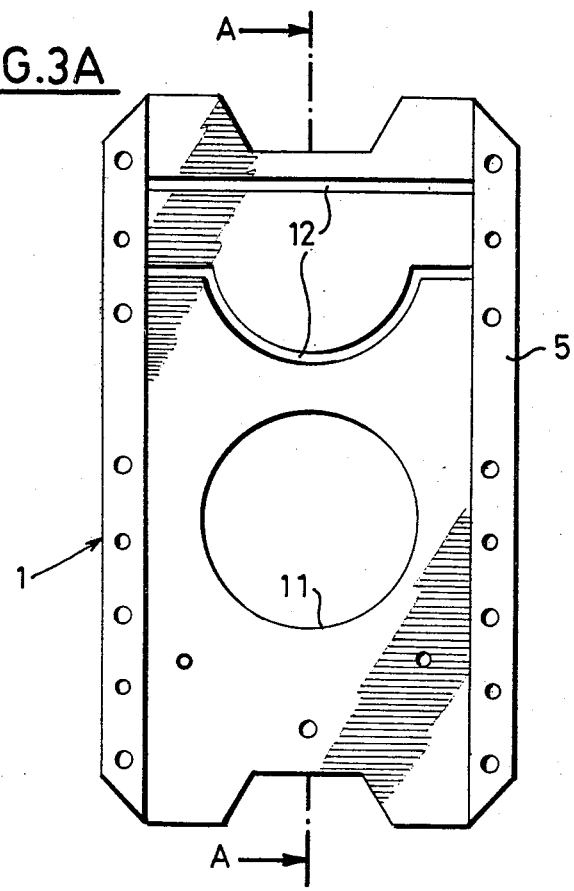
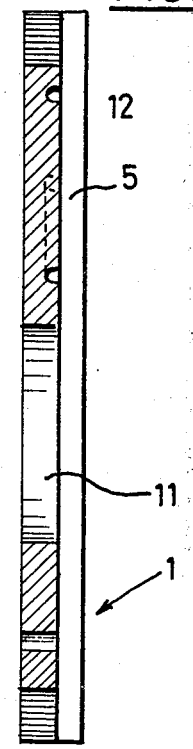
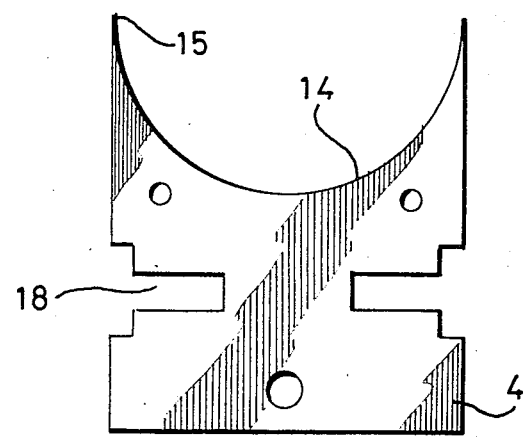
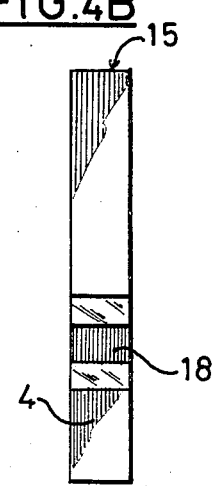

GUILLOTINE VALVE

The present invention relates to a valve of the guillotine type more particularly intended for powdered or granulated products and also for pasty products, i.e. paper pulp.

Presently-known valves of this type usually comprise an outer body provided with an opening for the passage of the products, it being possible to close off this passage at will by a slide in the form of a plate. This plate, still termed a guillotine, is usually mounted to be slidable in translation in opposite directions in guide slideways.

The drawback of these valves resides in the fact that, upon each closing operation, corresponding to the displacement of the guillotine plate to the closing position, a small amount of product penetrates, accumulates and becomes compressed inside the guide slideways. This parasitic accumulation gradually increases with the operations and it rapidly opposes the correct displacement of the plate and counters the desired seal in the closing position. Moreover, this drawback necessitates the frequent dis-assembly of the valve in order to put it back into a correct operating state and in particular to clean the slideways.

An object of the present invention is to overcome this major drawback and for this purpose provides an improved guillotine valve which is designed to be self-cleaning so as to avoid the aforementioned frequent dis-assemblies.

The invention therefore provides a guillotine valve comprising a plate movable in translation between two fixed side walls forming a body of the valve, the two side walls being provided with an aperture which can be selectively closed and opened by the plate which is slidably mounted between the side walls, said movable plate being guided by lateral edge portions thereof in slideways rigid with the two side walls, wherein there are interposed between the slideways and the movable plate elongated straight section members which are rigid with the movable plate and distinctly longer than said plate, said section members filling the whole of the space of the slideways and preventing the product which passes through the valve from penetrating and accumulating in the slideways.

According to a feature of the invention, the section members are tangent to the edge of the circle of said aperture and scrapers for cleaning the edges of the section members in contact with the product are provided at the point of tangency of the section members and the aperture.

According to another feature of the invention, the edge of the active portion of the plate is semi-circular and, when the valve is closed, said edge is applied against a fixed abutment which is interposed between the two side walls and has an edge which is also semi-circular and of a shape complementary to the edge of the plate, said edge of the abutment coinciding with the edge of the aperture so that, in the region of the edge of said aperture, the assembly comprising the side walls and the abutment does not define a groove or a transition.

A better understanding of the invention will be had from the ensuing description with reference to the accompanying diagrammatic drawings which represent, merely by way of example, an embodiment of the valve according to the invention.

FIG. 1 is a plan view of the valve according to the invention;

FIG. 2 is a plan view of the inner mechanism of the valve;

FIGS. 3A and 3B are respectively a plan view and a sectional view, taken on line A—A of FIG. 3A, of one of the side walls of the valve;

FIGS. 4A and 4B are respectively a plan view and a left hand side view of the fixed abutment 4;

Figure 5A:
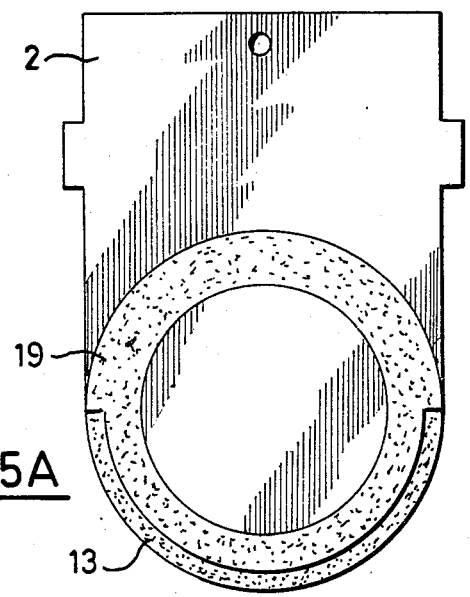
FIGS. 5A and 5B are respectively a plan view and a side elevational view of the guillotine plate.
Figure 5B:
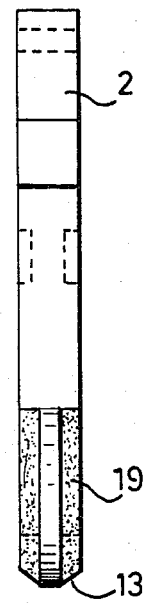
Figure 6:
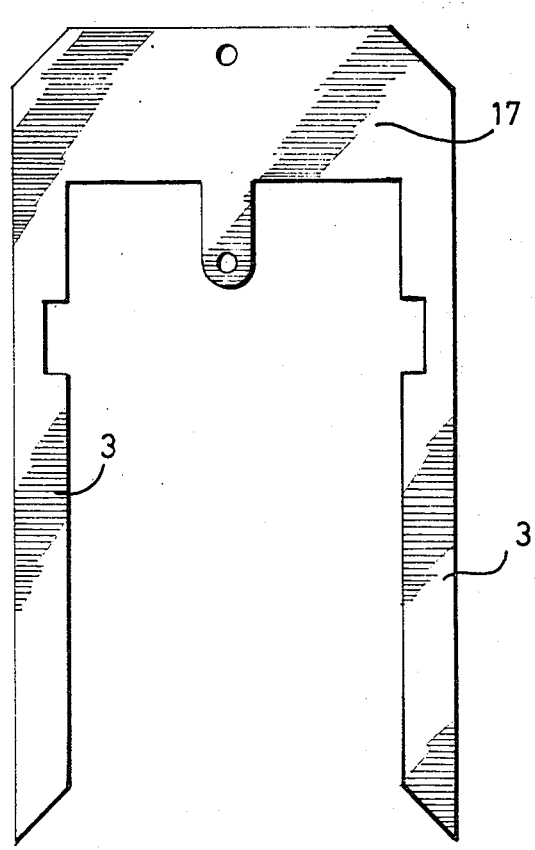
FIG. 6 is a plan view of the front face of the chassis.

The valve according to the invention is a valve of the guillotine type, i.e. a valve comprising a plate or blade 2 disposed between two fixed side walls 1, these two side walls being provided with an aperture 11 which the plate is capable of closing by sliding between the side walls, this movable plate being guided in its movements in translation in opposite directions in slideways 5 rigid with the two side walls 1. Interposed between these two slideways 5 and the movable plate 2 are elongated section members 3 which are rigid with lateral sides of the movable plate and distinctly longer than this plate. These section members 3 fill the whole of the groove of the slideways and prevent the product which passes through the valve from accumulating in said slideways and thereby avoid an obturation thereof.

Furthermore and according to the invention:

(a) The rectilinear section members 3 are tangent to the edge of the circle of the aperture 11 of the side walls.

(b) Provided at the point of tangency are scrapers 15 adapted to clean the edge portions of the section members 3 in contact with the product passing through the valve.

Figure 7:
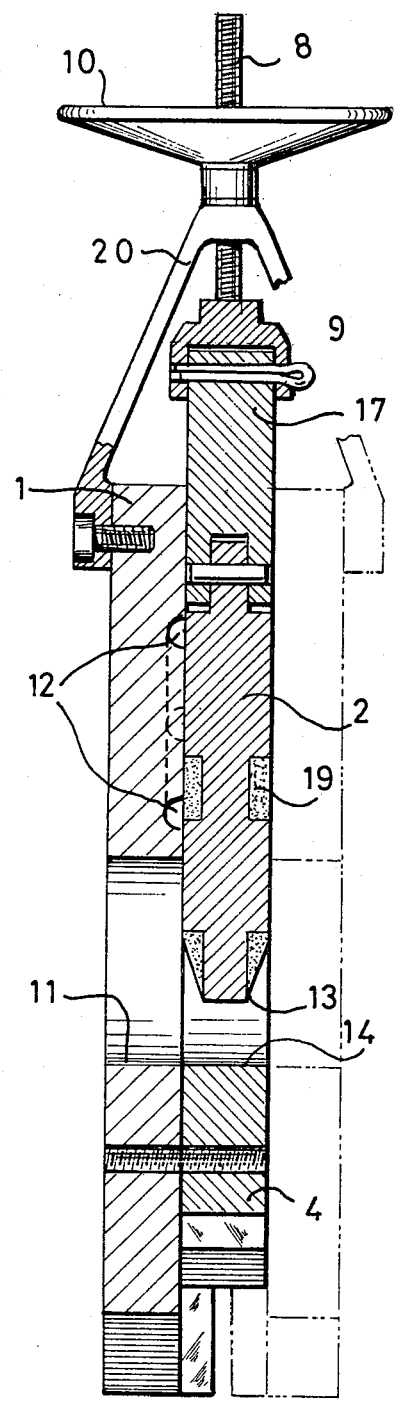
FIG. 7 is a sectional view of the whole of the mechanism taken on line B—B of FIG. 2.

The edge 13 of the active portion of the plate 2 is semi-circular and, when the valve is closed, said edge 13 is applied against a fixed member 4 which is interposed as a sandwich between the two side walls 1 and has an edge 14 which is also semi-circular and of a shape complementary to the shape of the edge 13 of the plate 2. This edge 14 has the same radius as that of the aperture 11 of the side walls so that, on the edge of this aperture, the assembly comprising the side walls 1 and the member 4 does not define a groove of transition (FIG. 7).

The member 4 is in contact with the section members 3 on its edges 16 and, owing to the fact that these section members 3 are tangent to the edge of the circle of the aperture 11, the member 4 terminates on each side in tapering portions in the shape of a knife edge 15 which form two scrapers for cleaning the section members 3.

The active edge 13 of the plate 2 is beveled so as to split or burst the product when the valve is closed.

The section members 3 are interconnected by a tie 17 located at the end of the plate opposed to the active edge thereof and the assembly comprising the section members 3 and the tie 17 forms a frame supporting the plate 2 on which frame a suitable operating system is fixed.

An annular lining 19 of stellite is disposed on each side of the plate 2 and forms a bearing surface of the plate 2 against the side walls 1 (FIG. 7).

The plate 2 is fixedly fitted in the section members 3.

Provided in the fixed abutment 4 are lateral cavities 18 for receiving devices comprising a shoe 7 in contact with each of the section members 3 against which it is applied by the force exerted by a spring 6. This shoe has two functions, namely, on one hand, cleaning by the wiping of the section members 3 and, on the other hand, increasing the seal in the region of contact between the fixed abutment 4 and the section members 3. On the side members 1, two grooves 12 (FIG. 3A) have been provided for placing therein O-section sealing members whose purpose is to ensure the perfect cleaning of the plate 2 and a good seal.

For operating the valve (the opening and closing thereof) a rapid-pitch screw 8 (FIG. 2) is mounted by means of a fork member 9 on the tie 17 and terminates in its upper part in an operating handwheel 10 by means of which the plate-camping frame 3 and 17 is made to slide between the fixed slideways 5 and carry along therewith the plate 2. The screw 8 is maintained on the valve by a triangular structure 20, termed a support column, fixed on each side of the side walls.

It must be understood that the scope of the invention is not intended to be limited solely to the embodiment of the valve described hereinbefore by way of example but encompasses all modifications.

I claim:

1. Guillotine valve comprising two fixed side walls forming a body of the valve and defining a space, a plate slidable movable in translation in said space between the two side walls, the plate having a transversely extending leading active edge, an aperture in each side wall which aperture is capable of being selectively closed and opened by the plate, the plate having lateral edge portions, two elongated extension portions extending the lateral edge portions of the plate beyond said leading edge, slideways rigid with the side walls and defining longitudinal cavities in which cavities the lateral edge portions and the extension portions of the plate are slidably and guidedly engaged, the edge portions and the extension portions of the plate permanently filling said longitudinal cavities irrespective of the position of the plate and thereby preventing product which passes through the valve from penetrating and accumulating in the cavities of the slideways, said leading edge of the plate extending from one of said extension portions to the other of said extension portions and having a contour which is complementary to the contour of a part of said apertures which part faces said leading edge and extends from one of said extension portions to the other of said extension portions, and means filling said space between said side walls in the region of said parts of said apertures and being flush with said parts of said apertures so that there is no groove defined between said filling means and said parts of said apertures.

2. Valve as claimed in claim 1, wherein each aperture is circular and the section members are tangent to the edge of the circle of said aperture.

3. Guillotine valve comprising two fixed side walls forming a body of the valve, a plate slidably movable in translation between the two side walls, an aperture in each side wall which aperture is capable of being selectively closed and opened by the plate, slideways rigid with the two side walls and slidably engaging lateral edge portions of the plate for guiding the plate, elongated straight section members which are rigid with the movable plate and distinctly longer than said plate and interposed between the slideways and the movable plate, said section members filling the whole of space of the slideways and preventing the product which passes through the valve from penetrating and accumulating in the slideways, and a fixed abutment member interposed as a sandwich between the two side walls and having an upper edge which is semi-circular, the plate having an active portion having an edge which is semi-circular, and has a shape which is complementary to the shape of the edge of the abutment member and, when the valve is closed, said edge of the active portion being applied against the semi-circular edge of the abutment member, and said edge of the active portion coinciding with the edge of the apertures so that, in the region of said apertures, the assembly comprising the side walls and the abutment member does not define a groove.

4. Valve as claimed in claim 3, wherein the fixed abutment is in contact by lateral edges thereof with the section members and the section members are tangent to the edge of the apertures, and the abutment member terminates on each side thereof in tapering portions which form two scrapers for cleaning the section members.

5. Valve as claimed in claim 1 wherein the plate has an active edge which is beveled so as to split or burst the product when the valve is closed.

6. Guillotine valve comprising two fixed side walls forming a body of the valve, a plate slidably movable in translation between the two side walls, an aperture in each side wall which aperture is capable of being selectively closed and opened by the plate, slideways rigid with the two side walls and slidably engaging lateral edge portions of the plate for guiding the plate, elongated straight section members which are rigid with the movable plate and distinctly longer than said plate and interposed between the slideways and the movable plate, said section members filling the whole of a space of the slideways and preventing the product which passes through the valve from penetrating and accumulating in the slideways, and a tie interconnecting the section members and located at an end of the plate opposed to an active edge of the plate and the assembly of the section members and the tie forming a frame supporting the plate on which frame there is mounted a valve operating system.

7. Valve as claimed in claim 3 comprising an annular lining of stellite provided on opposite sides of the plate which are adjacent the side walls so as to form a bearing surface of the plate against the side walls.

8. Valve as claimed in claim 3 wherein the plate is fixedly fitted in the section members.

9. Valve as claimed in claim 3, comprising on each lateral side of the fixed abutment member a cavity and a cleaning shoe which is received in the cavity and is in contact with the corresponding section member and springs respectively bearing the shoes against the corresponding section members.

10. Valve as claimed in claim 3 wherein the side walls have two grooves therein in which grooves O-section sealing members are disposed in contact with the plate for improving a cleaning of the plate and sealing qualities of the valve.

11. Valve as claimed in claim 1, wherein said leading edge of the plate has a convex contour and said parts of the apertures having a correspondingly concave contour and said extension portions are tangent to said apertures, said filling means being of metal and defining tapering scrapers at each lateral end in scraping contact with said extension portions.

* * * * *